(12) United States Patent
Yamabuchi

(10) Patent No.: US 6,366,345 B1
(45) Date of Patent: Apr. 2, 2002

(54) MONITOR FOR MONTORING PERIPHERY OF VEHICLE

(75) Inventor: Hiroshi Yamabuchi, Tokyo (JP)

(73) Assignee: Mitsubishi Denki Kabushiki Kaisia, Tokyo (JP)

( * ) Notice: Subject to any disclaimer, the term of this patent is extended or adjusted under 35 U.S.C. 154(b) by 0 days.

(21) Appl. No.: 09/628,169

(22) Filed: Jul. 28, 2000

(30) Foreign Application Priority Data

Jan. 28, 2000 (JP) .......................................... 12-019895

(51) Int. Cl.[7] .......................... G01C 3/08; G01B 11/26; G02B 26/08; B60T 7/16
(52) U.S. Cl. .................. 356/4.01; 356/5.01; 356/141.1; 359/226; 180/169
(58) Field of Search ...................... 356/4.01, 5.01–5.15, 356/141.1; 180/169; 359/226

(56) References Cited

U.S. PATENT DOCUMENTS

| | | | |
|---|---|---|---|
| 3,897,151 A | * | 7/1975 | Lecroy |
| 4,853,532 A | * | 8/1989 | Stauffer |
| 5,076,690 A | * | 12/1991 | de Vos et al. |
| 5,146,287 A | * | 9/1992 | Carder |
| 5,455,669 A | * | 10/1995 | Wetteborn ................. 356/5.01 |
| 5,808,727 A | * | 9/1998 | Katayama ................ 356/141.1 |
| 5,848,485 A | * | 12/1998 | Anderson et al. ........ 356/141.1 |

FOREIGN PATENT DOCUMENTS

JP          8-122061          5/1996          ............ G01C/3/06

* cited by examiner

Primary Examiner—Stephen C. Buczinski
(74) Attorney, Agent, or Firm—Sughrue Mion, PLLC

(57) ABSTRACT

The present invention provides a very practical monitor for monitoring the periphery of a vehicle characterized in that: the dimension of the monitor in the vertical direction is small, so that the monitor can be incorporated into a small vehicle without putting any restrictions; and the performance and characteristic are excellent. The present invention discloses a specific mechanism to realize the monitor for monitoring the periphery of a vehicle. The present invention provides a monitor for monitoring the periphery of a vehicle comprising: a radiating means for radiating waves of light, having an optical system means for removing astigmatic difference of a light source; and an optical path changing means including a reflection mirror for reflecting a luminous flux radiated from the radiating means in a direction of the radiated light diffusing means. It is possible to change the optical path while astigmatic difference of the light source is being corrected.

8 Claims, 5 Drawing Sheets

DIRECTION ANGLE $D_n$
$D_n = n \times (360/N) + \Delta T_{mn} \times \omega$
  N : NUMBER OF PERIODS PER ONE REVOLUTION OF DRIVE REFERENCE SIGNAL
  $\omega$ : ANGULAR SPEED OF ROTOR DISTANCE $R_n$
$R_n = 0.5 \times C \times \Delta T_{rn}$    C : VELOCITY OF LIGHT

MONITOR FOR MONTORING PERIPHERY OF VEHICLE

BACKGROUND OF THE INVENTION

1. Technical Field of the Invention

The present invention relates to a monitor for monitoring a periphery of a vehicle with an optical radar device wherein light waves emitted from the optical radar device scan an object in the horizontal direction, and light waves reflected on the object and returned to the optical radar device are received, so that a distance from the optical radar device to the object and a direction to the object can be detected. More particularly, the present invention relates to a monitor for monitoring the periphery of a vehicle characterized in that only one set of monitoring devices can monitor a wide area in the periphery of a vehicle.

2. Description of the Related Art

A conventional optical radar device used for this type monitor for monitoring a periphery of a vehicle is disclosed, for example, in JP-A-8-122061, which is operated in such a manner that an object is scanned with light waves in the horizontal direction so that the object can be detected in a wide range.

According to the above patent publication, there is disclosed an arrangement including a rotary shaft of a rotary driving means for conducting scanning and an optical system of a light sending means, wherein the rotary shaft and the optical system are arranged on the same axis.

When the monitor for monitoring the periphery of a vehicle is incorporated into the vehicle, space for housing the monitor is usually limited by structures and designs of the vehicle itself. Especially when the monitor is designed in such a manner that it protrudes out from the vehicle body in the vertical direction, someone may feel that the design is odd. Therefore, it is common that the space for housing the monitor is greatly limited in the vertical direction. However, according to the above conventional monitoring device, the dimension in the vertical direction is increased. Therefore, serious problems may be encountered when the monitoring device is incorporated into a vehicle.

Further, according to the above conventional monitoring device, the specific structure and adjusting mechanism for obtaining a desired performance and characteristic are not disclosed at all. After all, it can be said that the above patent publication discloses no device that can be put into practical use.

SUMMARY OF THE PRESENT INVENTION

The present invention has been accomplished to solve the above problems of the related art. The present invention provides a very practical monitor for monitoring the periphery of a vehicle characterized in that: the dimension in the vertical direction is small, so that the monitor can be incorporated into a small vehicle without any restrictions; and the performance and characteristics are excellent. The present invention discloses a specific mechanism to realize the monitor for monitoring the periphery of a vehicle.

According to a first aspect of the present invention, there is provided a monitor for monitoring the periphery of a vehicle comprising: a radiating means for radiating waves of light, having an optical system means for removing astigmatic difference of a light source by using a pair of cylindrical lenses, prisms and mirrors; and an optical path changing means including a reflection mirror for reflecting the luminous flux radiated from the radiating means in a direction of the radiated light diffusing means. Since, it is possible to change the optical path while astigmatic difference of the light source is being corrected, the degree of freedom of design is enhanced without being restricted by the position of the radiating means. Accordingly, the dimension of the device in the vertical direction can be easily reduced.

According to a second aspect of the present invention, there is provided a monitor for monitoring the periphery of a vehicle in which the radiated light diffusing means, reflected light converging means, light receiving means and reflecting mirror of the optical path changing means are arranged on the axis of the rotary shaft, and the radiating means is arranged perpendicular to the axis on the same plane as that of the reflecting mirror. Therefore, the dimension of the device in the vertical direction can be remarkably reduced.

According to a third aspect of the present invention, there is provided a monitor for monitoring the periphery of a vehicle, in which the radiated light diffusing means and reflected light converging means are respectively provided with female screws and integrated into one body when locking screws are screwed into the female screws, and the respective angle positions of the screws with respect to the rotary shaft can be adjusted so that the optical axis of the light radiated and the optical axis of the reflected light can become parallel with each other. When the positions of the light receiving optical system and the drive system are adjusted so that they can make a right angle with each other on the horizontal face, the optical axis of light receiving can be adjusted in a desired geometric direction. Next, when the light sending optical system is adjusted so that the optical axis can be parallel with the light receiving optical axis, the light sending optical axis and the light receiving optical axis can be relatively arranged in a geometric arrangement with accuracy, so that the desired performance and characteristic can be provided.

According to a fourth aspect of the present invention, there is provided a monitor for monitoring the periphery of a vehicle, wherein the inner structural components integrated into one body by the frame member are housed in the outer shell. When the inner structural components are integrated into one body by the frame member, the above adjustment work can be easily performed, and further the assembling work can be easily performed. Furthermore, the mechanical strength of the device can be enhanced.

According to a fifth aspect of the present invention, there is provided a monitor for monitoring the periphery of a vehicle, further comprising a light shielding member for preventing a portion of the waves of light radiated and diffused by the radiated light diffusing means from being incident on the light receiving means when the portion of the waves of light are reflected on the inner face of the outer shell or the inner structural components. Due to the foregoing, erroneous detection of the receiving light is prevented. Therefore, it becomes possible to detect an object located in a short distance which tends to be affected by erroneous detection.

According to a sixth aspect of the present invention, there is provided a monitor for monitoring the periphery of a vehicle, in which the angle position of the rotary shaft is precisely detected when the rotary drive means is driven by feedback control at constant angular speed and when the accumulated totals of the clock pulses of the reference signals and a speed difference outputted according to the comparison of the reference signal at this time with the feedback signal, are jointly counted.

DETAILED DESCRIPTION OF THE PRESENT INVENTION

Figure 1:
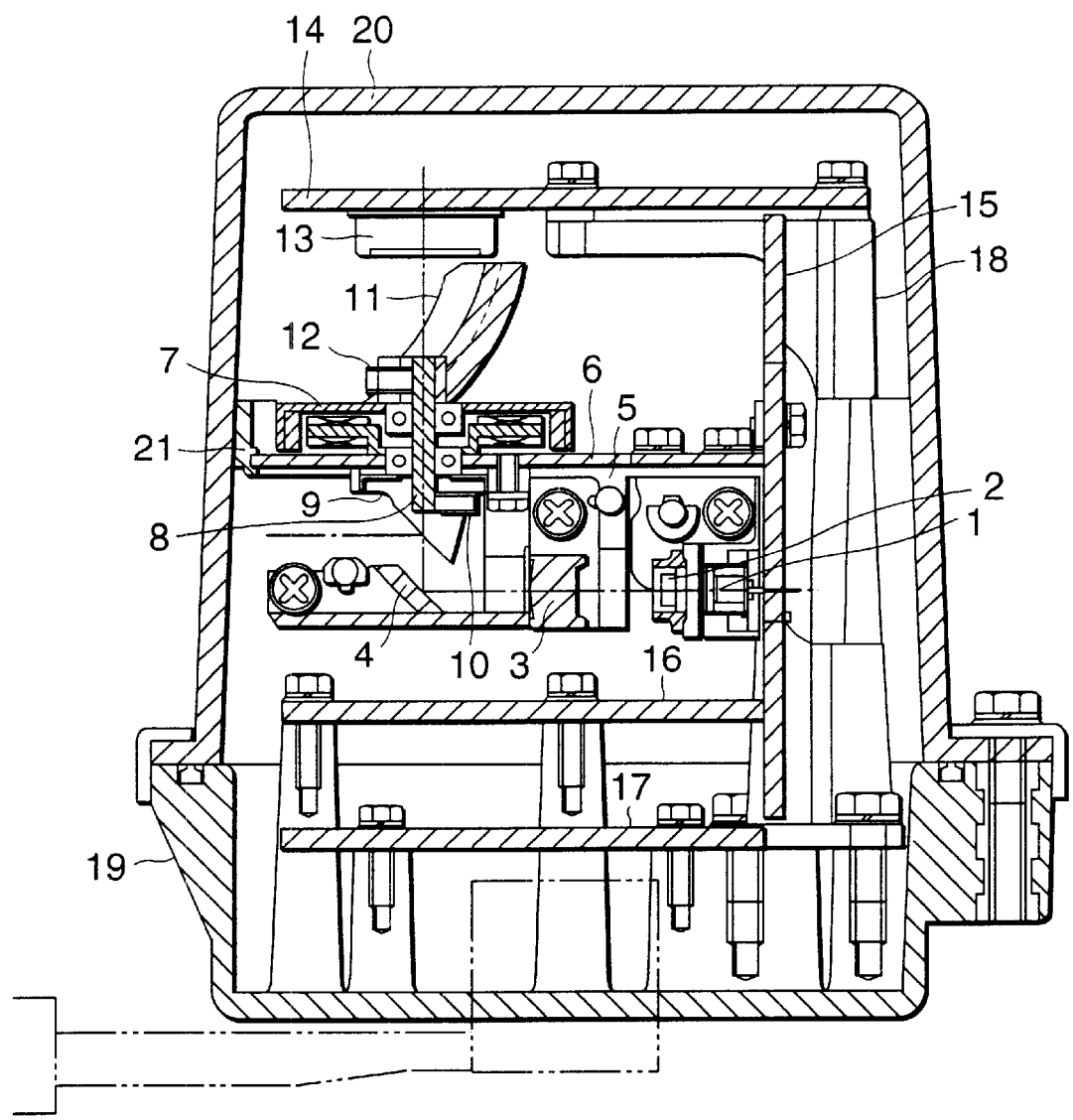
FIG. 1 is a cross-sectional view showing an arrangement of the monitor for monitoring the periphery of a vehicle of the present invention.
Figure 2:
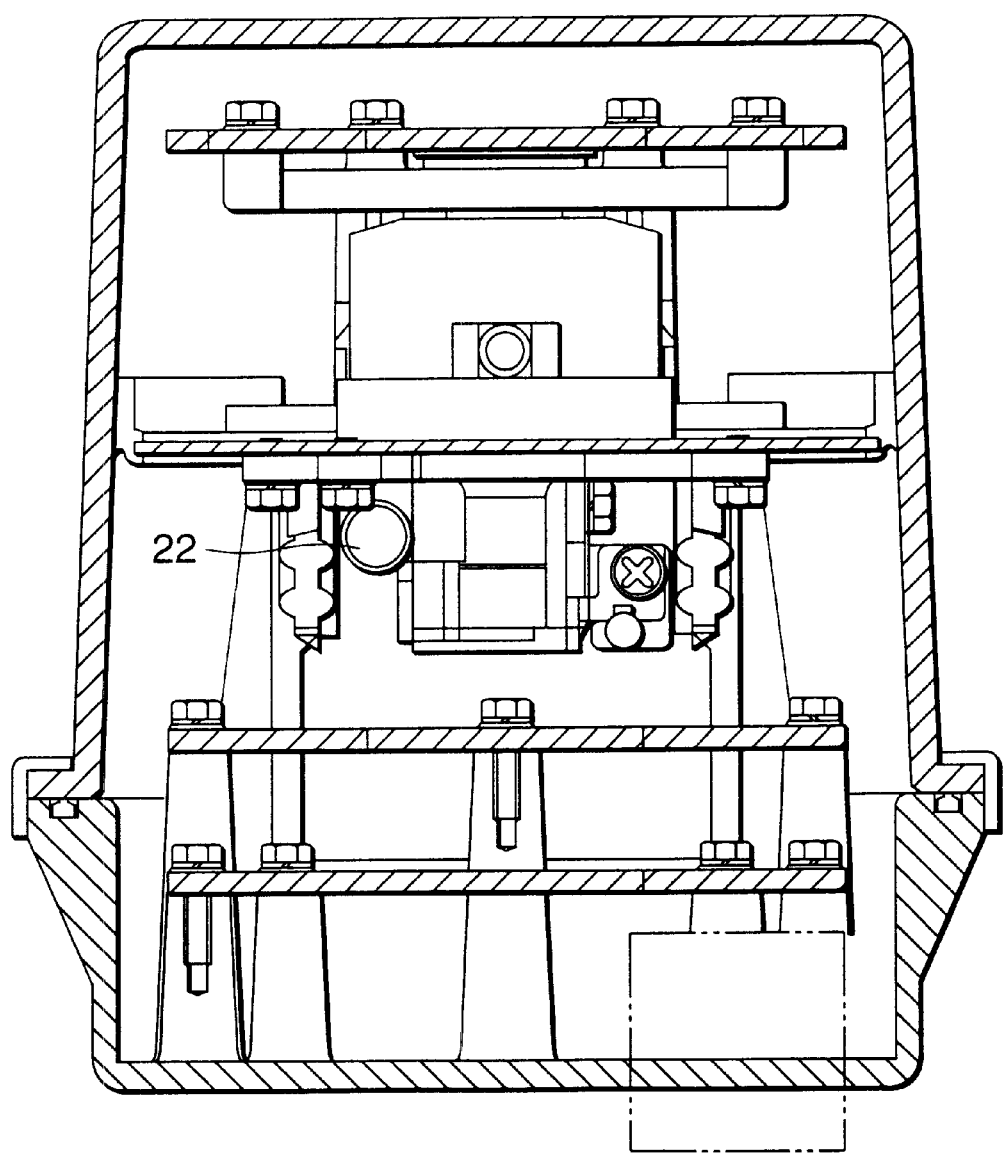
FIG. 2 is a cross-sectional side view showing the monitor for monitoring the periphery of a vehicle of the present invention.
Figure 3:
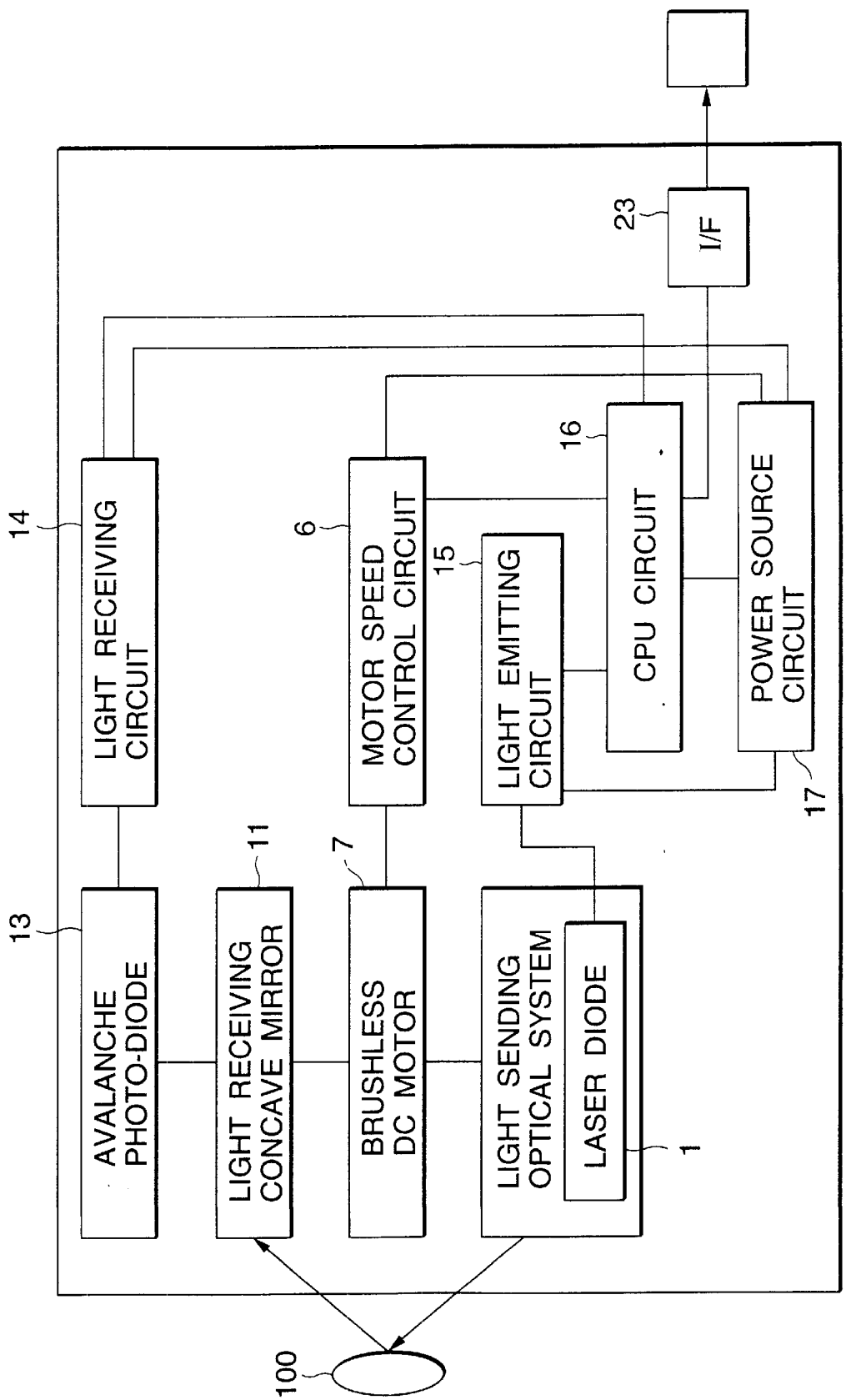
FIG. 3 is a block diagram showing an arrangement of the monitor for monitoring the periphery of a vehicle of the present invention.
Figure 4:
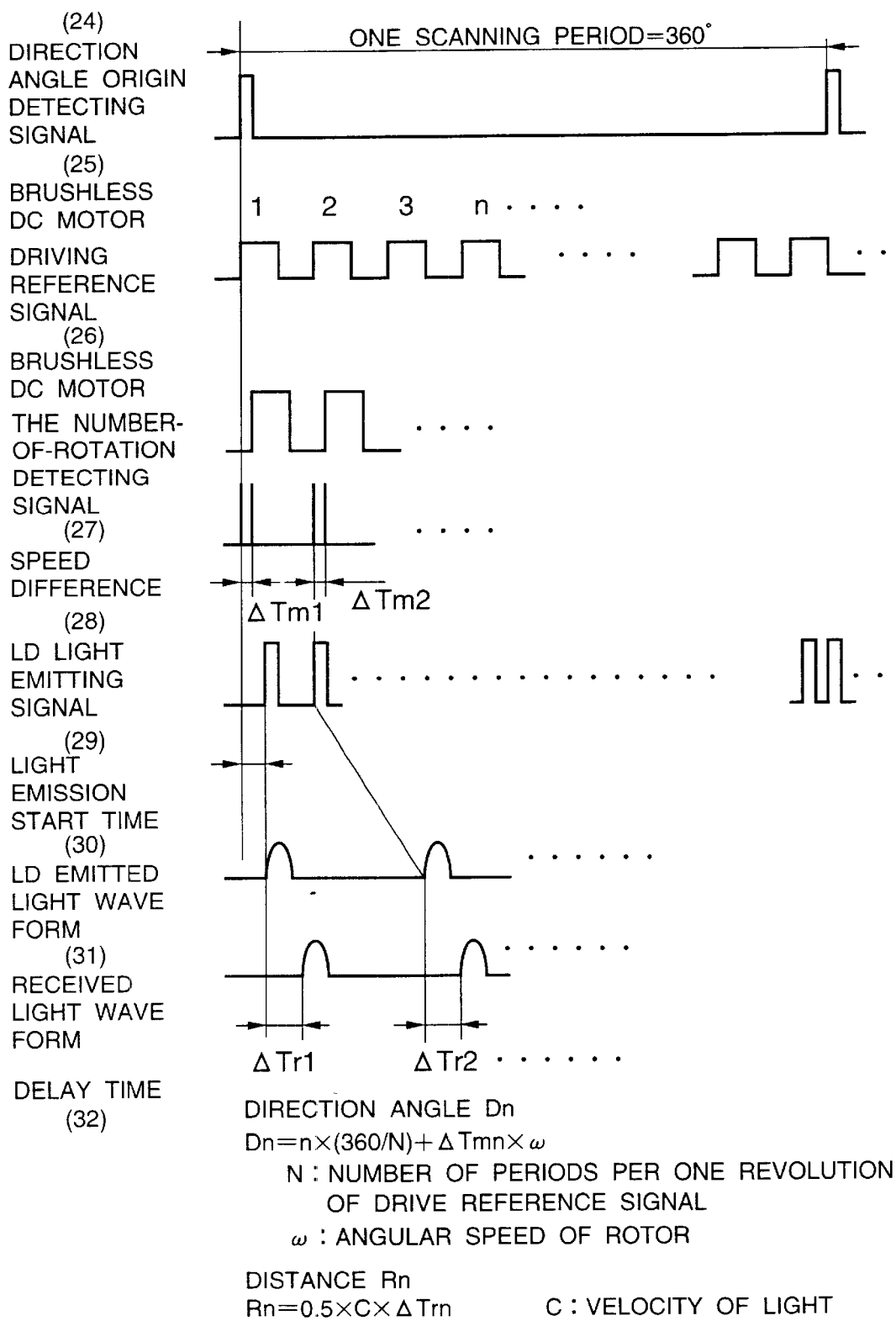
FIG. 4 is a chart showing the principle of operation of the monitor for monitoring the periphery of a vehicle of the present invention.
Figure 5:
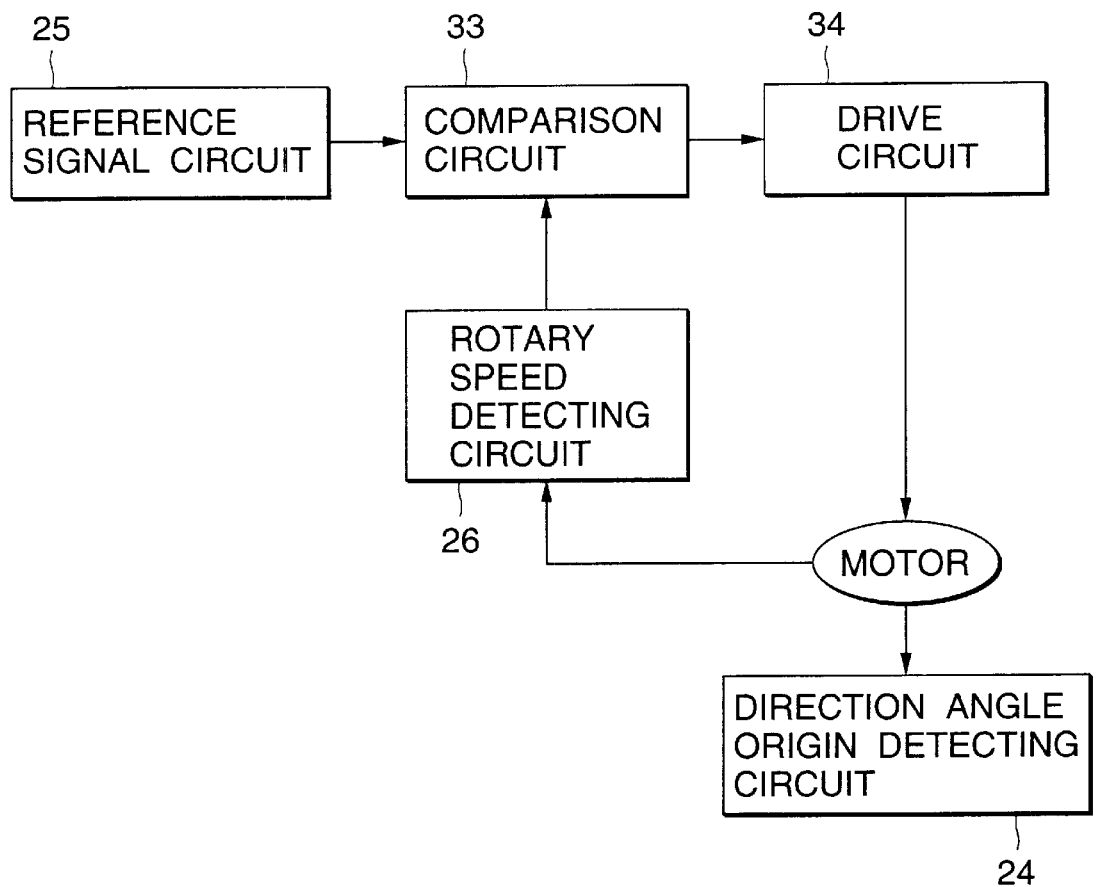
FIG. 5 is a block diagram showing speed control of a motor of the monitor for monitoring the periphery of a vehicle of the present invention.

Referring to FIGS. 1 to 5, an embodiment of the present invention will be explained below. FIG. 1 is a vertical cross-sectional view showing an inner structure of a monitor for monitoring the periphery of a vehicle of the present invention. The monitor for monitoring the periphery of a vehicle of the present invention is incorporated into a vehicle not shown and detects an object in the periphery of the vehicle.

In the drawing, reference numeral 1 is a laser diode which is a light source, reference numeral 2 is a primary lens for converging to a predetermined angle a spread angle in the horizontal direction of the beams of light emitted from the laser diode 1, and reference numeral 3 is a secondary lens for converging to a predetermined angle a spread angle in the vertical direction of the beams of light. In this case, the primary lens 2 and the secondary lens 3 compose an optical system to remove astigmatic difference. Further, the primary lens 2 and the secondary lens 3 compose a radiation means together with the laser diode 1. Reference numeral 4 is a stationary plane mirror for changing an optical path of the luminous flux of the beams of light proceeding in the horizontal direction after the astigmatic difference has been removed by the primary lens 1 and the secondary lens 3, so that the optical path of the luminous flux of the beams of light can be changed by a substantial right angle in the vertical direction. This stationary plane mirror 4 composes an optical path changing means. Reference numeral 5 is a holder which is a fastening means for integrating the above optical system with a position adjusting mechanism system for adjusting the positions of the individual optical components. Reference numeral 6 is a base board on which an electronic circuit is composed for controlling a rotational speed of a brushless DC motor composing the rotating drive means. This base board 6 composes a scanning means. Reference numeral 7 is a rotor of an outer rotor type brushless DC motor. Reference numeral 8 is a rotary shaft of the brushless DC motor. Reference numeral 9 is a cylindrical mirror, which is fixed at one end of this rotary shaft 8 by a locking nut 10, the curvature of which is formed so that the optical path of the beams of light reflected by the stationary plane mirror 4 can be further changed in the horizontal direction and also the spread angle of the beams of light in the vertical direction can be a predetermined angle. In this case, the cylindrical mirror 9 can emit the beams of light in all directions (360°) in accordance with the rotation of the rotary shaft 8.

Reference numeral 11 is a concave mirror which is fixed at the other end of the rotary shaft 8 by a locking screw 12. This concave mirror 11 receives and converges a part of the beams of light reflected by the cylindrical mirror 9 and retroreflected by an object to be detected. An focus of the concave mirror is set at an axis of the rotary shaft 8. In this connection, when the locking screws 10 and 12 are loosened, the cylindrical mirror 9 and the concave mirror 11 are adjusted so that the optical axes of both the mirrors become parallel with each other. After the adjustment of the cylindrical mirror 9 and the concave mirror 11 has been completed, the locking nuts 10 and 12 are fastened and fixed. Reference numeral 13 is a light receiving element arranged on the axis of the rotary shaft 8 so that the light receiving element 13 is positioned at the focus of the concave mirror 11. Reference numeral 14 is a light receiving base board composed of an electronic circuit to amplify a quantity of electricity electrically converged to by the light receiving element 13. Reference numeral 15 is a light emitting base board to supply electric energy to the laser diode 1. Reference numeral 16 is a CPU board which gives a light emitting trigger signal and a light receiving trigger signal respectively to the light emitting board 15 and the light receiving board 14, wherein when the beams of reflected light are sent from an object to be detected, CPU board conducts a series of control and calculation to calculate a distance from the device to the object to be detected by the delay time and the propagation speed of the waves of light while a time difference to the moment at which the light receiving signal amplified by the light receiving circuit exceeds a certain threshold value is being counted. CPU board 15 composes a distance calculation means. Reference numeral 17 is an electric power supply circuit to operate the laser diode 1, brushless DC motor, light receiving element 13, light emitting board 15 and CPU board 16.

Reference numeral 18 is a chassis which is a frame member used for integrating the holder 5, brushless DC motor, light receiving element 13 and light emitting board 15 so that the optical system on the light sending side is integrated into one body. Reference numeral 19 is one of the outer shell composing bodies which composes a bottom section of the device. An inner structural body to which the chassis 18 is fixed is held by the outer shell composing body 19. Reference numeral 20 is the other outer shell structural body fixed to the outer shell 19 in such a manner that the other outer shell structural body covers the inner structural components. This outer shell structural body 20 is made of optical material having such a spectral characteristic that the wave-lengths of the waves of light emitted from the laser diode 1 can be transmitted through the outer shell structural body 20, and the wave-lengths of the sunlight and artificial light, which cause disturbance, can be shut off. Reference numeral 21 is a light shielding member for shielding between the light sending side and the light receiving side in order to prevent the occurrence of erroneous detection which is caused in such a manner that a portion of the waves of light emitted from the laser diode 1 are separate from a predetermined optical path formed in the device until the waves of light pass through the outer shell 20 and are emitted outside the device, so that the waves of light are irregularly reflected inside the device and further a portion of the thus irregularly reflected waves of light reach the light receiving element 13. Reference numeral 22 is a light receiving element for detecting the deterioration of the transmitting property of the beams of light when soil, rain water or snow attaches to the surface of the outer shell.

Next, operation will be explained as follows. The laser diode 1 is incorporated into the holder 5 in which the primary lens 2, secondary lens 3 and plane mirror 4 are integrated with each other into one unit. Therefore, the laser diode 1 is one of the components of the unit. The laser diode 1 is connected with the light emitting board 15 and generates laser beams when this light emitting board 15 is driven. The luminous flux of the thus generated laser beams are formed into a predetermined spread angle on the horizontal face by the primary lens 2, which is a non-cylindrical convex lens, so as to remove astigmatic difference caused by the light source. After the luminous flux of the thus generated laser beams have been formed in this way, they are emitted. Defocus adjustment is conducted on the primary lens 2 so that the luminous flux of the laser beams can have a spread angle of about 1 degree, and then the primary lens 2 is positioned. After the spread angle in the horizontal direction of the laser beams has been formed, the spread angle of the laser beams on the vertical face is formed by the secondary lens 3, which is the second non-cylindrical lens, so that the spread angle of the laser beams on the vertical face can be a predetermined angle. Then, the laser beams, the spread angle of which has been formed in this way, are emitted. Defocus adjustment is conducted on the secondary lens 3 so that the luminous flux of the laser beams can have a spread angle of about 1 degree in the vertical direction, and then the secondary lens 3 is positioned. By the actions of the primary lens 2 and the secondary lens 3, the beams of light, from which astigmatic difference of the light source has been generally removed, can be formed.

The laser beams are reflected on the plane mirror 4 in the vertical direction by the angle of about 90 degrees and incident on the cylindrical mirror 9 and reflected. After the laser beams have been reflected on the cylindrical mirror 9, they are transmitted through the outer shell 20 and sent to the periphery of the monitor for monitoring the periphery of a vehicle. At this time, the shielding film 21 shields the laser beams which leak to the light receiving element 13 side by the reflection conducted on the inner faces of the device, so that the occurrence of erroneous detection by the light receiving circuit 14 can be prevented. The fixing positions of the mirrors with respect to the rotary shaft 8 are adjusted so as to adjust the mirror angles by the locking screws 10, 12 so that the optical axis of the beams of light reflected on the cylindrical mirror 9 in the horizontal direction and the optical axis of the concave mirror of the light receiving system can become substantially parallel with each other. Due to the foregoing, the beams of light to be sent can be emitted into the visual field of the beams of light to be received.

The beams of light sent out in this way are irradiated onto an object to be detected such as a vehicle 100, and a portion of the beams of light are retroreflected by the object. The beams of light retroreflected by the vehicle 100 are reflected in various directions, and a portion of the beams of light are returned to the monitor for monitoring the periphery of a vehicle. These beams of retroreflected light are transmitted through the outer shell 20 and incident on the concave mirror 11 and reflected. These beams of light have the focus at the axial center of the rotary shaft 8. The concave mirror 11 is a parabolic light receiving mirror, the optical axis of the optical light receiving visual field of which is arranged in a direction perpendicular to the rotary shaft, and this concave mirror 11 is formed into a paraboloid of a revolution around this optical axis. The beams of light are converged to the focus by the paraboloid of revolution of the concave mirror 11, and the beams of retroreflected light are received on the light receiving face of the light receiving element 13 arranged close to the focus. The light receiving element 13 conducts photoelectric conversion by which an electric signal is output corresponding to an intensity of received light. According to this embodiment, in order to detect even a very small quantity of retroreflected light, in the case of photoelectric conversion conducted by the light receiving element 13, a photo diode having the avalanche effect is used, wherein the avalanche effect is a phenomenon in which a quantity of photoelectric conversion is exponentially increased in such a manner that a generated pair of electron and positive hole successively induce the same pair of electron and positive hole in the process of movement to the electrode. The received light signal amplifying circuit mounted on the light receiving board 14 further amplifies the electric signal which has been photoelectrically converted. This amplified signal is transmitted to CPU board 16 by which time is measured by this light receiving signal.

The distance calculation means mounted on CPU board 16 calculates the distance to the vehicle 100 as follows. The distance calculation means measures the time from when the light emitting board 15 drives the laser diode 1 so as to emit light to when the light receiving signal is generated on the light receiving board 14, and the thus measured time is assumed as the time required when the laser beams reciprocate between the device and the vehicle 100, that is, the thus measured time is assumed as the propagation delay time. The distance from the device to the vehicle 100 is calculated according to this propagation delay time.

The direction detecting means mounted on CPU board 16 includes: a reference signal circuit 25 to generate a reference speed signal for controlling the rotary speed of the rotor 7 of the brushless DC motor at a constant speed; a rotary speed detection circuit 26 to detect the rotary speed of this rotor 7 and generate a feedback signal; and a comparison circuit 33 to compare the reference speed signal with the feedback signal and detect a speed difference 27 (phase difference in this embodiment) between them. The feedback control system is composed in a manner in which an intensity of voltage or current impressed upon the status coil of the motor is controlled according to the difference 27 in speed output by the comparison circuit 33 so that the angular speed of the rotor 7 can be controlled constant. Due to the foregoing, the accumulated totals of the clock pulses of the reference speed signal are counted by the counter, so that the reference angle of the rotary shaft 8 can be detected.

In this connection, the speed difference 27 (jitter), which is a fluctuation of the rotary speed, is actually caused because of friction in the bearing section and also because of an imbalance of the magnetic force between the rotor side magnet and the stator side coil. A quantity of this fluctuation corresponds to a phase difference obtained when the reference speed signal and the feedback signal are compared with each other. Therefore, this phase difference can be used as a quantity of corrected angle with respect to the reference angle. The reference position, at which counting the number of the clock pulses of the reference speed signal is started, is detected by the azimuth origin detection circuit 24 each time the motor is rotated by one revolution.

Due to the above arrangement, the rotational angle position of the motor can be precisely detected at all times, that is, the direction angle between the optical axis of the light sending optical system and the optical axis of the light receiving optical system can be precisely detected at all times. For example, when the conventional stepping motor is used, the detection angle is 3.75°. On the other hand, it is possible to obtain the angle resolving power of 0.05° in this embodiment.

Next, horizontal scanning of the beams of light will be explained below. As described before, the rotary angle of the rotary shaft 8 is precisely detected at all times by CPU board 16 and the speed control circuit board 6 of the brushless DC motor, and a light emitting signal for driving the laser diode 150 that the laser diode 1 can emit light is supplied to the light emitting board 15 at predetermined intervals. The accumulated totals of the number of the reference clock pulses to conduct speed control of the brushless DC motor when the light emitting signals are given are counted by the counter which is a counting means, and the quantity of corrected angle generated at the same time is counted by the counter in the same manner after the signal of the speed difference 27 has been subjected to analog-digital conversion. Both are synthesized with each other by CPU, and the result is output as a precise azimuth angle.

The light emitting signal is generated by controlling the light emitting board 15 so that a voltage to drive the laser diode 1 can be impressed upon the laser diode 1 each time the rotary shaft 8 of the brushless DC motor reaches a predetermined angle position. When the beams of light are emitted at each angle position of the brushless DC motor, scanning can be conducted detecting an angle in the horizontal direction.

In the monitor for monitoring the periphery of a vehicle composed as described above, the positions of the primary lens 2, secondary lens 3 and stationary mirror 4 are adjusted and further the optical axes of the cylindrical mirror 9, which becomes a scanning mirror, and the light receiving concave lens 11 are adjusted in parallel with each other. Since the optical axis of the cylindrical mirror 9 and the optical axis of the light receiving concave mirror 11 are directed in the same direction and both the mirrors are rotated integrally with each other, even when the beams of light are sent in an arbitrary direction, the beams of light retroreflected on an object to be detected can be positively incident on and converged to the light receiving element 13. Therefore, the predetermined performance and characteristic can be positively obtained.

Next, the data of design and manufacture of this embodiment will be explained below. In the following embodiment, it was confirmed that the dimension of the device in the vertical direction was reduced to 67% of the dimension of the conventional device. Dimension in the vertical direction of the conventional device was 122 mm (100%), and dimension in the vertical direction of the device of this embodiment was 81.5 mm (67%).

Primary Lens 2
  Material: amorphous polyolefine
  Refractive index: 1.52 (in the case of wave-length 0.85 $\mu$m)
  Method of manufacture: injection molding of resin
  Lens surface treatment: vapor-deposition of antireflection film $MgO_2$ provided on both sides
  Lens type: non-cylindrical plane convex lens
  Curvature: −0.4279
  Non-cylindrical coefficient: −0.55
  The present inventors confirmed the following by calculation. When the angle of 20° was formed between the beams of light incident on this lens and the optical axis, the angle of the beams of light collimated by this lens was 0.067° with respect to the optical axis, that is, the beams of light were substantially parallel. Actually, defocusing adjustment was conducted on this lens so that the spread angle in the horizontal direction of the beams of light could become 1° which is the requirement of this device.

Secondary Lens 3
  Material: optical glass BK7
  Refractive index: 1.51 (in the case of wave-length 0.85 $\mu$m)
  Method of manufacture: mechanical polishing
  Lens surface treatment: vapor-deposition of antireflection film $MgO_2$ provided on both sides
  Lens type: non-cylindrical plane convex lens
  Curvature: −0.1284
  Non-cylindrical coefficient: −0.01
  The present inventors confirmed the following by calculation. When the angle of 10° was formed between the beams of light incident on this lens and the optical axis, the angle of the beams of light collimated by this lens was 0.499° with respect to the optical axis. In the case of this lens, the position in the direction of the focus was not conducted, and designing and assembling were performed so that the spread angle of the beams of light in the vertical direction could be 1° which is the requirement of this device.

Stationary Plane Mirror 4
  Material: amorphous polyolefine
  Reflectance: 80% (in the case of wave-length 0.85 $\mu$m)
  Method of manufacture: injection molding of resin
  Mirror surface treatment: vapor-deposition of aluminum, and vapor-deposition of antireflection film of MgF (magnesium fluoride)
  Mirror type: plane mirror Cylindrical Mirror 9
  Material: amorphous polyolefine
  Reflectance: 80% (in the case of wave-length 0.85 $\mu$m)
  Method of manufacture: injection molding of resin
  Mirror surface treatment: vapor-deposition of aluminum, and vapor-deposition of antireflection film of MgF (magnesium fluoride)
  Mirror type: non-cylindrical mirror
  Curvature: −0.007
  Non-cylindrical coefficient: −0.01

Concave Mirror 11
  Material: amorphous polyolefine
  Reflectance: 80% (in the case of wave-length 0.85 $\mu$m)
  Method of manufacture: injection molding of resin
  Mirror surface treatment: vapor-deposition of aluminum, and vapor-deposition of antireflection film of MgF (magnesium fluoride)
  Mirror type: mirror of paraboloid of revolution
  Curvature: −0.071
  Non-cylindrical coefficient: −1

As described above, according to the monitor for monitoring the periphery of a vehicle, it is possible to change the optical path while astigmatic difference of the light source is being corrected. Therefore, the degree of freedom of design is enhanced without being restricted by the position of the radiating means. Accordingly, the dimension of the device in the vertical direction can be easily reduced.

According to the monitor for monitoring the periphery of a vehicle, the radiating means is arranged perpendicular to the axial center on the same plane as that of the reflecting mirror. Therefore, the dimension in the vertical direction can be remarkably reduced. Accordingly, less restrictions are laid down when the device is incorporated into a vehicle, which can provide a remarkable effect in the practical use of the device.

According to the monitor for monitoring the periphery of a vehicle, the optical axis of sending light and the optical axis of receiving light can be easily adjusted by a simple structure. Therefore, the predetermined performance and characteristic can be positively obtained, which can provide a remarkable effect in the practical use of the device.

According to the monitors for monitoring the periphery of a vehicle, when the inner structure is integrated into one unit by the frame member, the optical system can be easily adjusted, and further the assembling work can be easily performed, and furthermore the mechanical strength of the device can be enhanced. As a result, various effects such as securing the quality, enhancing the reliability and reducing the manufacturing cost can be provided.

According to the monitor for monitoring the periphery of a vehicle, erroneous detection of the receiving light, which is caused by the beams of light reflected on the inner face of the device, is prevented. Therefore, it becomes possible to detect an object located in a short distance which tends to be affected by erroneous detection. Accordingly, the safety and reliability can be remarkably enhanced.

According to the monitor for monitoring the periphery of a vehicle, it is possible to obtain a remarkably high resolving power. Especially, it becomes possible to precisely detect the position of an object located at a long distance. Accordingly, the safety and reliability can be remarkably enhanced.

What is claimed is:

1. A monitor for monitoring the periphery of a vehicle comprising:

radiating means including an optical system having any one of a pair of cylindrical lenses, a pair of prisms, and a pair of mirrors for removing astigmatic difference of a light source, whereby the radiating means radiates light waves;

radiated light diffusing means including a cylindrical mirror for reflecting the light waves radiated by the radiating means, wherein the radiated light diffusing means forms a predetermined radial diffusion angled in a vertical direction;

reflected light converging means for converging light waves radiated and diffused by the radiated light diffusing means, and reflected from an object;

rotary drive means for rotating a rotary shaft, wherein the radiated light diffusing means and the reflected light converging means are respectively fixed to either end of the rotary shaft;

a scanning means for conducting scanning using the converged light waves by rotating the radiating light diffusing means and the reflected light converging means in the horizontal direction by driving the rotary drive means;

a light receiving means separated from the rotary drive means in the vertical direction, whereby the light receiving means receives the light waves converged by the reflected light converging means;

a distance calculation means for calculating a distance to the object according to a propagation delay time from when the radiating means radiates the light waves to when the light receiving means receives the reflected light waves; and an optical path changing means including a reflection mirror for reflecting the light waves radiated from the radiating means in a direction of the radiated light diffusing means.

2. The monitor for monitoring the periphery of a vehicle according to claim 1, wherein the radiated light diffusing means, the reflected light converging means, the light receiving means and the reflection mirror of the optical path changing means are disposed on an axis of the rotary shaft; and the radiating means is disposed perpendicular to the axis on the same plane as that of the reflection mirror.

3. The monitor for monitoring the periphery of a vehicle according to claim 1, wherein the radiated light diffusing means and the reflected light converging means respectively comprise female screws;

the radiated light diffusing means and the reflected light converging means are integrally fixed to the rotary shaft when locking screws are screwed into the female screws; and respective angle positions of the screws with respect to the rotary shaft are adjustable so that a first optical axis of the light wave radiated and a second optical axis of the reflected light waves are parallel with each other.

4. The monitor for monitoring the periphery of a vehicle according to claim 1, further comprising:

a fastening means for holding and integrating the rotary drive means, wherein at least the radiating means and the optical path changing means form an integrated means;

a frame member for holding and integrating the integrated means, wherein at least the light source of the radiating means, the light receiving means and an electronic circuit board form each of the means, and the frame member integrates them into one body; and an outer shell housing inner structural components integrated into one body by the frame member.

5. The monitor for monitoring the periphery of a vehicle according to claim 4, wherein the outer shell comprises a first outer shell and a second outer shell;

the inner structural components integrated into said one body by the frame member are fastened to the first outer shell; and the second outer shell is fastened to the first outer shell, wherein the inner structural components are covered with the first outer shell and the second outer shell.

6. The monitor for monitoring the periphery of a vehicle according to claim 4, further comprising a light shielding member for preventing a portion of the light waves radiated and diffused by the radiated light diffusing means from being incident on the light receiving means when the portion of the waves of light are reflected on an inner face of the outer shell or the inner structural components.

7. The monitor for monitoring the periphery of a vehicle according to claim 1, wherein, when the rotary drive means is driven by a feedback control at a constant angular speed, and when accumulated totals of clock pulses of reference signals and a speed difference are counted, an angular position of the rotary shaft is detected.

8. The monitor for monitoring the periphery of a vehicle according to claim 7, wherein the speed difference is output according to a comparison of the reference signals with feedback signals.

* * * * *